US012547979B2

United States Patent
Ramirez et al.

(10) Patent No.: US 12,547,979 B2
(45) Date of Patent: Feb. 10, 2026

(54) TRACKING INVENTORY AND ALERT SYSTEM

(71) Applicant: DISH Wireless L.L.C., Littleton, CO (US)

(72) Inventors: James Ramirez, Littleton, CO (US); Harold Stearns, Erie, CO (US); Laurel Dumonteil, Centennial, CO (US); Christopher George, Lees Summit, MO (US)

(73) Assignee: DISH Wireless L.L.C., Littleton, CO (US)

( * ) Notice: Subject to any disclaimer, the term of this patent is extended or adjusted under 35 U.S.C. 154(b) by 407 days.

(21) Appl. No.: 18/149,407

(22) Filed: Jan. 3, 2023

(65) Prior Publication Data

US 2024/0220919 A1 Jul. 4, 2024

(51) Int. Cl.
*G06Q 10/087* (2023.01)
(52) U.S. Cl.
CPC .................................. *G06Q 10/087* (2013.01)
(58) Field of Classification Search
CPC .................................................. G06Q 10/087
USPC ............................................................ 705/28
See application file for complete search history.

(56) References Cited

U.S. PATENT DOCUMENTS

| 7,216,086 B1* | 5/2007 | Grosvenor | G06Q 10/087 |
| | | | 705/28 |
| 2021/0097478 A1* | 4/2021 | Yang | G06Q 10/087 |
| 2021/0117911 A1* | 4/2021 | Chanduri | H04W 4/029 |
| 2022/0318697 A1* | 10/2022 | Liu | G06Q 10/08 |

* cited by examiner

*Primary Examiner* — Garcia Ade
(74) *Attorney, Agent, or Firm* — Kilpatrick Townsend & Stockton LLP

(57) ABSTRACT

A computer-implemented method for supply chain management is provided. In one example, the method includes: validating a supply chain event involving an inventory item based on a pre-established rule; determining presence or absence of a supply chain issue regarding the inventory item based on the validation; determining an issue type of the supply chain issue based on model issue types from an issue database; validating the supply chain issue based on pre-established issue templates from the issue database; generating one or more solutions to solving the supply chain issue; generating a computer ticket reporting the supply chain issue based on a pre-established ticket template from a ticket database; and transmitting the computer ticket to a support service.

20 Claims, 8 Drawing Sheets

TRACKING INVENTORY AND ALERT SYSTEM

BACKGROUND OF THE INVENTION

The present disclosure relates generally to supply chain management, and more particularly systems and methods for identification of a supply chain issue.

In a product distribution environment, particularly in the telecommunications industry, it is common for a company to manage supply chain of products and timely obtain a status of an inventory for the products and service it provides. For effective inventory management, a company generally must have the ability to collect inventory information for each inventory item (e.g., a wireless mobile device), review the current state of an item, issue and track the status of purchase orders and work orders, monitor production and distribution, and provide stock adjustments. The accuracy and availability of such inventory information are vital as transaction parties, contractors, carriers, customers, operations, and various functions of the company typically rely on such information for reporting purposes, as well as to make important short-term and long-term business decisions.

As an important part of supply chain management, a company needs to assure that a transaction involving an inventory item with a transaction party is efficient and accurate. Thus, the company needs to identify an issue regarding the inventory item at an early stage of the supply chain flow and timely report the issues to the appropriate business functions. If the issue is not efficiently identified or properly handled, serious problems in the downstream supply chain may result and incur significant management cost.

BRIEF SUMMARY OF THE INVENTION

In some embodiments, a computer-implemented method for supply chain management is provided. In one example, the method includes: receiving inventory data regarding an inventory item from a data source; generating an event based on the received inventory data; processing the event based on information from an inventory database; obtaining a live status of the inventory item; generating a record based on the live status of the inventory item; and determining one or more actions based on the event and the live status regarding the inventory item.

In another example, a method includes: validating a supply chain event involving an inventory item based on a pre-established rule; determining presence or absence of a supply chain issue regarding the inventory item based on the validation; determining an issue type of the supply chain issue based on model issue types from an issue database; validating the supply chain issue based on pre-established issue templates from the issue database; generating one or more solutions to solving the supply chain issue; generating a computer ticket reporting the supply chain issue based on a pre-established ticket template from a ticket database; and transmitting the computer ticket to a support service.

In another example, a method includes: (1) receiving continuously inventory data from at least one data source, the inventory data regarding at least one inventory item of an inventory; (2) generating continuously one or more supply chain events based on the received inventory data; (3) identifying, automatically and continuously, one or more supply chain issues in relation to the one or more supply chain events based on at least one model issue type from an issues database, wherein a first supply chain issue is identified at a first time point, and at least one additional supply chain issue is identified no earlier than the first time point; (4) validating the first supply chain issue based on at least one pre-established issue template from an issues database; (5) generating automatically a first computer ticket reporting the first supply chain issue and storing the first computer ticket in a tickets database; (6) determining presence or absence of a common feature between the first supply chain issue and the at least one additional supply chain issue, the presence of the common feature being indicated by at least one of: the first supply chain issue and the at least one additional supply chain issues are related to the same inventory item; and the first supply chain issue and the at least one additional supply chain issue are related to the same supply chain event; (7) accessing the tickets database to verify existence of the first computer ticket reporting the first supply chain issue, when the presence of a common feature between the first supply chain issue and the at least one additional supply chain issue is determined; (8) refraining from generating a new computer ticket separate and distinct from the first computer ticket for reporting the at least one additional supply chain issue, when the presence of a common feature between the first supply chain issue and the at least one additional supply chain issue is determined; and (9) transmitting the first computer ticket to a support service.

In some embodiments, a system for supply chain management is provided. In one example, a system comprising: an event generation module configured to receive inventory data from one or more data sources and to generate a supply chain event; an event processor configured to receive and process the supply chain event and to determine the presence or absence of a supply chain issue in relation to the supply chain event; a tickets module configured to automatically generate a computer ticket to report the supply chain issue; a batch processing module determine presence or absence of a common feature between or among a plurality of supply chain issues and to simultaneously generate a plurality of tickets for a plurality of supply chain issues; a ticket flood control module operable to categorize a plurality of computer tickets based on their common feature, combine computer tickets related to a common event or a common issue, refrain from generating duplicated and invalid computer tickets, and prioritize the computer tickets based on the criticality of the supply chain issue involved in each computer ticket; a communications server configured to transmit the computer ticket; and one or more inventory databases.

In another example, a computerized system for supply chain management includes an electronic processor; a machine-readable storage medium in electronic communication with the electronic processor; and instructions stored in the machine-readable storage medium and executable by the electronic processor to cause the system to: (1) receive continuously, by an event generation module, inventory data from at least one data source, the inventory data regarding at least one inventory item of an inventory; (2) generate continuously, by the event generation module, one or more supply chain events based on the received inventory data; (3) identify, automatically and continuously by an event processor, one or more supply chain issues in relation to the one or more supply chain events based on at least one model issue type from an issues database, wherein a first supply chain issue is identified at a first time point, and at least one additional supply chain issue is identified no earlier than the first time point; (4) validate, by the event processor, the first supply chain issue based on at least one pre-established issue template from an issues database; (5) generate automatically, by a tickets module, a first computer ticket reporting the first supply chain issue and storing the first computer ticket in a tickets database; (6) determine, by the batch processing module, presence or absence of a common feature between the first supply chain issue and the at least one additional supply chain issue, the presence of the common feature being indicated by at least one of: the first supply chain issue and the at least one additional supply chain issues are related to the same inventory item; and the first supply chain issue and the at least one additional supply chain issue are related to the same supply chain event; (7) access, by the tickets module, the tickets database to verify existence of the first computer ticket reporting the first supply chain issue, when the presence of a common feature between the first supply chain issue and the at least one additional supply chain issue is determined; (8) refrain from generating a new computer ticket separate and distinct from the first computer ticket for reporting the at least one additional supply chain issue, by a ticket flood control module, when the presence of a common feature between the first supply chain issue and the at least one additional supply chain issue is determined; and (9) transmit, by a communications server, the first computer ticket to a support service.

DETAILED DESCRIPTION OF THE INVENTION

Overview

Figure 1:
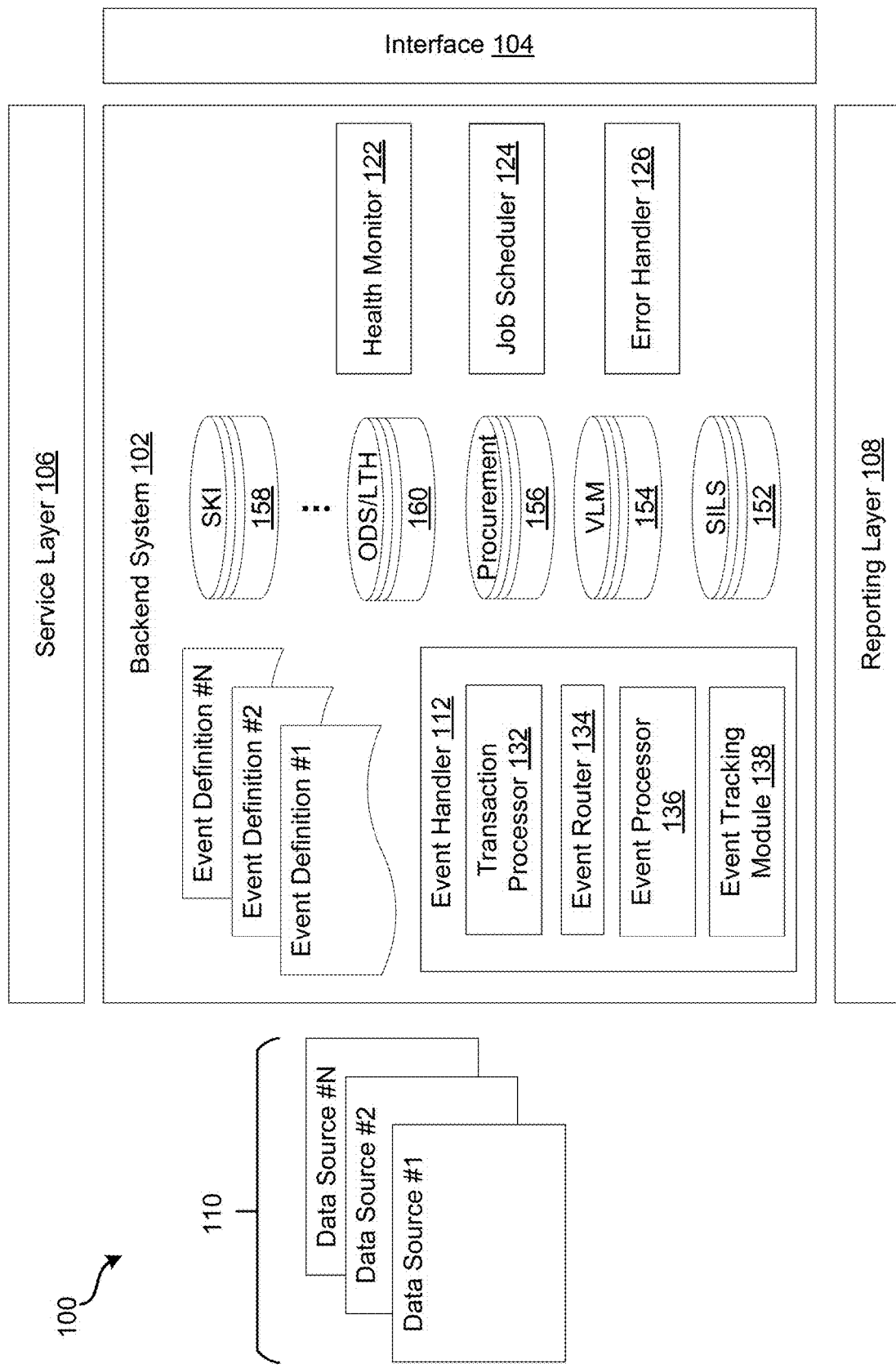
FIG. 1 is a schematic diagram illustrating an example system according to various embodiments.

The present disclosure provides systems and methods for supply chain management. A "supply chain" is a series of processes comprising of people, materials, products, skills, and knowledge that flow from one place to another place. For example, supply chain processes include, but are not limited to, inbound transportation of materials, manufacturing, warehousing, outbound shipping, placement of products in customer locations, maintenance sites or installation sites, maintenance of produces and also the return of products from customers back to retailers, distributors, wholesalers, or manufacturers. Further examples of supply chain processes include, but are not limited to, loading of inventory items, storing and managing of inventory, counting and inspecting inventory, counting and recording inventory change in storage, quality inspections, repair or replacement of defective inventory items, replenishment of missing inventory item, exchange of older inventory item for newer ones, taking of inventory item out of storage, audits, collection of metrics regarding cost, time, quality, quantity or other attributes of inventory items, planning of manufacturing processes, marketing and sales promotions, advertising, sponsorship or social media campaigns, employee training and education, labor disputes or strikes, or unloading of inventory item at a destination.

Identification of a supply chain issue is vital to the management of supply chain. Traditionally, human operators are often involved in the identification and validation of supply chain issues in the supply chain flow. However, when the supply chain is long, maintaining the efficiency and accuracy by human operators can be challenging.

In various embodiments, a novel computer-implemented method is provided. The method includes, among other things, generating a supply chain event, identifying and validating a supply chain issue in relation to the supply chain event, and automatically generating a computer ticket to report the supply chain issue to a support service. The present method may allow for automatic identification of an issue regarding an inventory item in an early stage of the supply chain flow. Additionally, the present method employs various databases in the automatic determination of the supply chain issue and generation of computer tickets, thereby reducing human intervention and labor cost and improving both time efficiency and accuracy.

In various embodiments, the present method employs a batch process to handle a plurality of issues and generate a plurality of computer tickets in an efficient manner. The present method may be also used to validate the supply chain issue by analyzing the transaction type of the transaction where the issue arises from. The present method automatically withhold generation and/or transmission of the computer ticket to the support service until the supply chain issue is validated, thereby improving the supply chain management efficiency.

In various embodiments, the present method employs a ticket validation and verification process to consolidate the computer tickets, remove invalid and duplicated computer tickets, reduce the number of computer tickets, and avoid the "ticket flood" problem. In particular, the present method could be used to continuously and automatically monitor a voluminous inventory and process numerous supply chain issues in an efficient manner favorable to the supply chain management.

System

FIG. 1 is a schematic diagram illustrating an example system 100 configured to facilitate SILS data structure in accordance with one embodiment. In that embodiment, the system 100 is configured to manage a supply chain for a service/product provider, manage an inventory of products, establish and maintain a serialized inventory database, and track an inventory item, in accordance with the present disclosure. In the illustrated example, the system 100 includes, among other components, a backend system 102, an interface 104, a service layer 106, a reporting layer 108, and data sources 110. In various implementations, the system 100 may include one or more electronic processors configured to implement various functions provided the components of system 100, such as those shown in FIGS. 2-7. It should be understood, the system 100 is not limited by its constituent components shown in this example. That is, it is not intended to limit the system 100 to one single computer device or more than one computer device. In accordance with the present disclosure, system 100 can be implemented by one or more computer device.

As shown in FIG. 1, the backend system 102 includes, among other components, an event handler 112, multiple databases, a health monitor module 122, a job scheduler 124, and an error handler 126. The multiple databases may include a serialized inventory live status (SILS) database 152, a virtual location management (VLM) database 154, a procurement database 156, a stock keeping unit information (SKI) database 158, an event history (transaction history) database 160. Other databases may also be included in the backend system 102. In addition, the databases included in the backend system 102 may be consolidated or integrated or otherwise share the same database platform.

The event handler 112 is configured to handle individual events received/generated by the backend system 102. A given individual event (i.e., a supply chain event) can indicate a creation/modification/retrieval of one or more data records managed by the backend system. In this example, the event handler 112 includes, among other components, a transaction processor 132, an event router 134, an event processor 136, an event tracking module 138.

In this example, the transaction processor is configured to process a transaction received as indicated by an event received by the event handler 112. For instance, a manual transaction of a new device activation may be entered through interface 104, which, in turn, generate an event of recording the device activation. This event is intercepted by the event handler 112 and a transaction of the new device is activation can be recorded in procurement database 156 through the transaction processor 132.

In this example, the event router 134 is configured to route an event received by the event handler 112 to an appropriate sub-module of the event handler 112 based one or more definitions of the events. For instance, the event of the new device activation is routed to the event processor 136 for further processing, and an event of device tracking request is routed to the event track module 138 for further processing. As shown, individual definitions of the events can be stored in the backend system 102. A given definition of a particular event can specify one or more actions to be taken upon receiving this event by the event handler 112.

In this example, the event processor 136 is configured to process an event received by the event handler 112. For instance, the new device activation event request can be received by the event processor 136, which, in turn, is configured to instruct the transaction processor 132 to create a record in the procurement database 156 as a result of the new device activation event received by the event handler 112.

The event tracking module 138 is configured to track one or more events received by the event handler 112. For example, the events received by the event handler 112 can include an event inquiring about a status of a particular device. After receiving this event, the event router 134 routes the event to the event tracking module, which, in turn, generates an inquiry into the VLM database 154 for a status for the particular device.

As can be seen, in this example, the backend system 102 includes various databases including a serialized inventory live status (SILS) database, a virtual location management (VLM) database 154, a procurement database 156, a SKI database 158, an ODS/LTH database 160, and/or any other databases. In this example, the SILS database is configured with SILS data structures in accordance with the disclosure. The SILS database thus is enabled to persist eSIM profiles and attributes available for individual devices in the backend system 102. It is noted that additional databases may be included in the backend system 102, such as the databases shown in FIG. 2.

Figure 2:
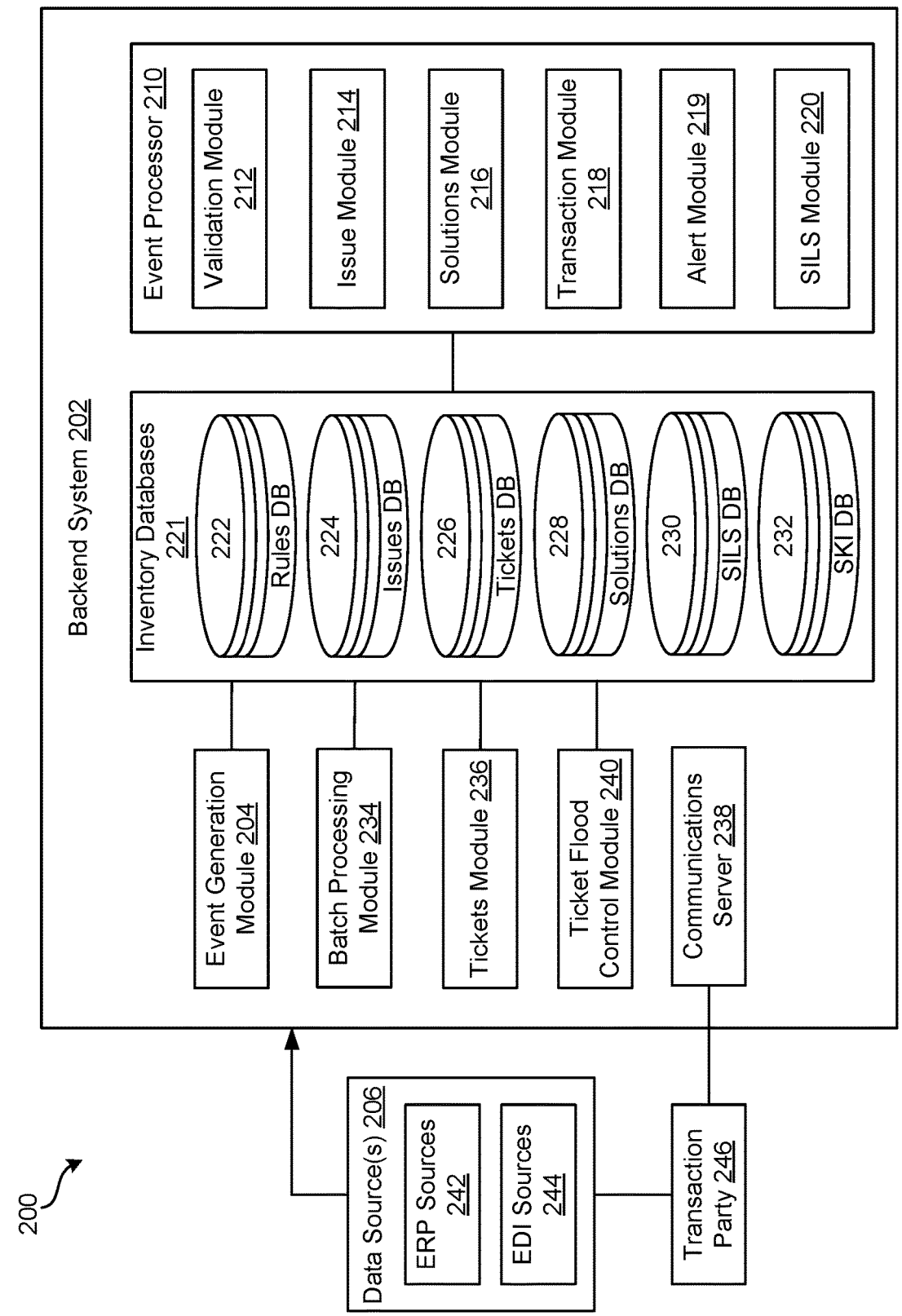
FIG. 2 is a schematic diagram illustrating an example of a supply chain management system according to various embodiments.

FIG. 2 is a schematic diagram illustrating an example of system 200 for supply chain management in accordance with some embodiments. In the illustrated example, the system 200 includes, among other things, a backend system 202. The backend system 202 further includes an event generation module 204, an event processor 210, one or more inventory databases 221, a batch processing module 234, a tickets module 236, and a communications server 238. It is noted that the system 200 is a variation of the system 100 and may include any component of the system 100.

The event generation module 204 is configured to receive inventory data from one or more data sources 206. The data source 206 may contain inventory data regarding an inventory item to be managed or is managed by the system 200. In some embodiments, the data source 206 may contain inventory data involved in a transaction of the inventory item with a transaction party 246. Examples of the transaction party include but are not limited to, a customer, a vendor, an external service provider, an internal warehouse provider, a third-party warehouse provider, a business partner, a trade organization, and so on.

In some embodiments, the data source 206 includes, among other things, an enterprise source planning (ERP) source and an electronic data interchange (EDI) source. Examples of the data source 206 include but are not limited to a purchase order (PO) for a particular inventory item, a procurement invoice for a particular inventory item, a business-to-business sales order, an inventory transfer order, a PO acknowledgement record, an advanced shipment notice (ASN), and so on. Additional examples of the data sources 206 include but are not limited to, a customer data source, a supplier source, a business partner source, a transportation management source, a route management source, a freight forwarding source, a freight brokerage source, a warehouse management source, a global trade management source, a financial source, a banking source, a credit card processing source, an online sales source, a sales support source, a customer relationship management source, a supplier relationship management source, a human source management source, a time and attendance source, an online database, a source containing publicly available data, a source containing private data, a system containing military data, or a source containing government data.

The event generation module 204 is further configured to process the received inventory data from the data source(s) 206, convert the received inventory data into supply chain data that is computer-readable, and generate a supply chain event (sometimes also referred to as an "event') containing the computer-readable supply chain data. In some embodiments, the event generation module 204 may access an event database (not shown), retrieve a pre-established event template stored in the event database, and convert the event into a standard format according to the event template. The supply chain event may be also stored in the event database.

The event processor 210 is configured to receive and process the event. In some embodiments, the event processor 210 further includes, among other things, a validation module 212, an issues module 214, a solutions module 216, a transaction module 218, an alert module 219, and an SILS module 220. The one or more inventory databases 221 include, among other things, a rules database 222, an issues database 224, a tickets database 226, and a solutions database 228, a serialized inventory live status (SILS) database 230, and a stock keeping unit information (SKI) database 232. It is noted that additional databases, such as the databases of the system 100, may also be included in the system 200.

The validation module 212 is configured to analyze the event based on information from the one or more inventory databases 221, and validate the event based on a pre-established rule from the rules database 222. In some embodiments, the validation module 212 accesses the SILS database 230, retrieves serialized information regarding the inventory item from the SILS database 230, compares the serialized information with the supply chain data from the event, validates the event based on the comparison, and generates an outcome of the validation.

In some embodiments, the SILS database 230 contains a pre-established SILS data structure. The SILS data structure includes at least one instance corresponding to the inventory item in relation to the event. The instance further includes serialized information of the inventory item. In some embodiments, the inventory item is a mobile user device such as a smartphone. Examples of the serialized information of the mobile user device include but are not limited to, an electronic serial number (ESN), an international mobile equipment identification (IMEI), a mobile identification number (MIN), an unlocking code for the handset, a subscriber information module (SIM) card code, an embedded SIM (eSIM) card code, a SIM card profile, an eSIM card profile, a universal integrated circuit card (UICC) code, an embedded UICC (eUICC) code, a UICC profile, an eUICC profile, a serial number of a finished handset assembly, a serial number of a basic component (e.g., speakers, microphones, keypads, displays, ringers, processors, chipsets, memories, displays, batteries) or an add-on component (e.g., communication devices, cameras, location technologies, multimedia players) of a finished handset.

In some embodiments, the validation module accesses the SKI database 232. The SKI database may be a separate database from the SILS database and contains at least one instance corresponding to the inventory item. The instance may contain the stock keeping unit (SKU) number and/or other product and manufacturing information regarding the inventory item. In some embodiments, the inventory item is in a form of a kit including a user device and a SIM/eSIM associate with the user device. The SKI may include an instance containing a single SKU profile assigned to both the user device and the SIM/eSIM. The single SKU profile advantageously allows for the tracking the user device and obtaining a live status thereof without the need for using separate SKU profiles for the user device and the SIM/eSIM.

The rules database 222 may include at least one pre-established rule for event validation. In some embodiments, the rules database 222 includes at least one instance corresponding to a specific type of event. For example, the event may be related to a purchase order (PO) from a business or an individual customer involving a transaction of an inventory item. The pre-established rule regarding the PO may prescribe one or more conditions needed to be satisfied in order for the PO to be validated. As an example, one condition may specify that the SKU number provided in the PO must match with the recorded SKU number of the SKI database 232 with respect to the inventory item in the PO. In another example, the event is related to an unlock request submitted by a user of a user device. The pre-established rule may prescribe a condition requiring a match between the serialized information of the user device provided in the unlock request with the serialized information stored in the SILS database 230. Table 1 provides a non-exclusive list of example pre-established rules for event validation.

TABLE 1

Non-limiting examples of pre-established rules for event validation.

| Pre-established rule for event validation | Presence of issue |
|---|---|
| ASN Container should have a non-blank pallet ID | Missing pallet ID |
| Purchase Order should be present in the procurement database | Missing Purchase Order in the procurement database |
| SKU should be present in the SKI database | Missing SKU in the SKI database |
| ASN Container should have a non-blank container ID | Missing carton ID |
| Certain types of user device should have two IMEIs (IMEI-1 and IMEI-2) | Missing IMEI-2 |
| Unlock code should be generated when a user device is eligible for carrier unlock | Unlock code not found |
| SKU should be validated | SKU not validated |
| Purchase order number should be present and validated against the list of POs in the procurement database | Missing Purchase Oder number |
| Manual PIN code for device unlock should be sent to the consumer when the user device is eligible for unlock | Missing manual PIN code |
| When both SIM and eSIM are associated with a user device, SKUs for both the SIM and the eSIM should be present in the SKI database | Missing SIM SKU |

The issues module 214 is configured to determine presence or absence of one or more supply chain issues (sometimes also referred to as "issues") regarding the inventory item based on the outcome of the event validation. For example, the event relates to a PO for an inventory item, and the SKU number in the PO mismatches with the SKU number recorded in the SKI database 232 with respect to the inventory item, the event could not be validated. Accordingly, an issue regarding the mismatched SKU number is present.

In another example, the event relates to an unlock request for a particular user device. Analysis of the event based on the pre-established rules for device unlock indicates that the user device is not eligible for unlocking. Accordingly, the event is not validated, and an issue may be present.

In yet another example, the event involves the loading of a pallet of inventory items to a warehouse in a procurement process. Analysis of the event indicate that the pallet ID is either missing or could not be found in a procurement database. A pre-established rule specifies that the pallet ID of an incoming pallet must match with the pallet ID recorded in the procurement database. Accordingly, the event is not validated pursuant to the pre-established rule, and an issue may be present.

In some embodiments, the validation module 212 is configured to determine the presence or absence of multiple issues. The multiple issues may share a common feature, for example, relating to the same event, relating to the same transaction, or relating to the same inventory item. The multiple issues may include a first issue, a second issue, a third issue, and so on. The multiple issues may be of different issue types.

The issues module 214 is further configured to determine an issue type of the issue. The issues database 224 contains one or more instances corresponding to one or more pre-established model issue types. The model issue types may provide a reference or standard for the determination of the issue type of the issue related to the event. The issues module 214 is configured to access the issues database 224, identify the model issue type based on the supply chain data of the event, and determine the issue type of the issue based on the identified model issue type.

For example, a first issue in relation to the event involves a mismatch of SKU number in a PO. The issues database 224 includes a first model issue type containing a standard format for a SKU mismatch of the user device in a PO. The issues module 214 is capable of identifying the first model issue type from the issues database 224 and verify that the issue type of the first issue matches with the first model issue type. In another example, a second issue in relation to the event involves a mismatch of SIM number in a customer return order involving a user device. The issues database 224 contains a second model issue type including a standard format for a SIM number mismatch in relation to a customer return order. Similarly, the issues module 214 is capable of identifying the second model issue type from the issues database 224 and verify that the issue type of the second issue matches with the second model issue type.

The issues module 214 is further configured to validate the issues in relation to the event. In some embodiments, the issues database 224 further includes one or more pre-established issue templates. Each issue template may correspond to a specific issue type. The issue templates may be used to formalize the issue, generate a description or statement of the issue, include relevant supply chain data and serialized information regarding the inventory item in relation to the issue. In some embodiments, the issue templates are provided by the vendor or product provider for the inventory item. In some embodiments, the issue templates are generated based on previous issues that have been handled.

The solutions module 216 is configured to analyze the issue that has been validated and generate one or more solutions to the issue, based on one or more pre-established solution templates from the solutions database 228. In some embodiments, the solutions database 228 includes one or more pre-established solution templates, each solution template specific to an issue type or corresponding to a specific type of inventory item. In some embodiments, the solutions module 216 is configured to access the solutions database 228, identify one or more solution templates in relation to the issue identified and validated by the issues module 214, generate one or more solutions based on the identified solution templates, and record the one or more solutions.

In some embodiments, the issues module 214 also determines whether the issue is caused by a human mistake. For example, when an event involves a manual transaction of an inventory item, for example, a user device order by a customer, the customer might accidentally make a typo regarding the user device when submitting the PO. In such situation, the human mistake can be identified by the issues module 214. An error message may be transmitted to the user regarding the human mistake, without more effort on the formalizing the issue and generating the solution. Further, no computer ticket may be generated to report the issue caused by the human mistake in a manual transaction. Such flexibility allows to improve the overall efficiency and accuracy of issue identification at an early stage of the inventory item management system.

The transaction module 218 is configured to determine a transaction type based on the data received from the data source(s) 206. The transaction type may be an automatic transaction or a manual transaction. An automatic transaction means a transaction conducted or performed, in whole or in part, by electronic means or electronic records, in which the acts or records of one or both parties are not reviewed by an individual. By contrast, a manual transaction means a transaction that is not conducted online or electronically if the transaction is made available online or electronically.

In some embodiments, when the transaction involved in the event is a manual transaction, the issues module 214 may calculate a likelihood that the issue is caused by a human mistake and determine whether the likelihood is high (e.g., above a threshold level). If the likelihood is determined to be high, the issue is determined to be caused by a human mistake of the transaction party 246 involved in the transaction. Non-limiting examples of a human mistake may include a typo, a missing character of number, an error, etc. If the issue is determined to be a human mistake, the communications server 238 may be instructed to directly communicate with the transaction party 246 about the human mistake, and no ticket may be generated to report the issue until the presence of the human mistake is determined.

The alert module 219 is configured to generate a warning or alert about the issue. For example, when the validated issue is determined to be a high-priority issue based on a pre-established priority list, the alert module 219 may label the issue with an alert to warn a support service (e.g., a decision maker or action taker) of the issue. As another example, if a significant number of issues having a common issue type or related to a common inventory item are validated in a relatively short period of time, the alert module 219 may generate an alert or warning about a common feature shared by the plurality of issues.

The SILS module 220 is configured to track an inventory item of an inventory managed by the supply chain management system 200, transmit a status inquiry to the inventory item, receive data from the inventory item, process the data received from the inventory item, and obtain a live status of the inventory item. The SILS module 220 is further configured to communicate with the SILS database 230, access and retrieve SILS data from the SILS database, validate the live status of the inventory item based on the SILS data from the SILS database, and update the SILS database 230 to reflect a change of the live status regarding the inventory item. As mentioned above, the SILS database 230 includes one or more instances corresponding to one or more inventory items. Each instance includes one or more data fields containing serialized information of the corresponding inventory item. Each instance further includes data field(s) recording a history of the live statuses in an entire life cycle of the inventory item (e.g., from procurement to the end of life).

The batch processing module 234 is operable and in connection with the issues module 214 to validate a plurality of issues. In some embodiments, the batch processing module 234 is further configured to determine a relationship between or among the plurality of issues. For example, the plurality of issues may share a common feature, e.g., having a common issue type, relating to the same inventory item or the same type of inventory item, relating to the same purchase order, relating to the same warehouse distribution, etc. In some embodiments, the batch processing module 234 is further configured to determine time proximity between or among the plurality of issues. For example, multiple issues may be validated in a relatively short period of time, for example, within a few minutes. In some embodiments, when an unexpectedly large number of issues are identified in a very short period of time, the alert module 219 may generate a warning or alert regarding the issues.

The tickets module 236 is configured to automatically generate a computer ticket (also referred to as "support ticket" or "ticket request" or "ticket") to report the issue validated by the issues module 214. The tickets may be stored in a ledger. Each ticket may include, among other things, a description of the event, a description of the transaction involved in the event, a description of the issue related to the event, an alert or warning related to the issue, and one or more solutions to the issue. The communications server 238 is configured to transmit the ticket to a support service. The support service may be a support function team such as a help desk personnel, an operator, or a manager. The support service will review the ticket and the issue included therein, decide on the issue, and/or determine one or more actions on the issue.

In some embodiments, the batch processing module 234 may generate a plurality of tickets for a plurality of issues. The communications server 238 is configured to transmit the plurality of tickets to the support service in one batch.

In some embodiments, the backend system 202 further comprises a ticket flood control module 240. The ticket flood control module 240 is operable to avoid "ticket flood," which is a common problem for manual tickets. For example, if there are too many tickets transmitted to the operator separately, it will be hard for the operator to manage and prioritize the issues efficiently. This "ticket flood" will also lead to more chaos, where the majority of support time is wasted cleaning up queues filled with invalid tickets. In some embodiments, the ticket flood control module 240 is configured to organize the plurality of tickets, remove invalid tickets, group or categorize the plurality of tickets based on their common feature, combine tickets related to a common event or a common issue, and prioritize the tickets based on the criticality of the issue involved in each ticket, before transmitting the plurality of tickets to the support service. Additionally, the communications server 238 may be configured to transmit the plurality of tickets in one communication instead of sequential communications. In this way, the risk of "ticket flood" can be reduced or eliminated. Examples of the implementation of the ticket flood control module to avoid ticket flood problems are described below with references to FIGS. 5A-5C.

In some embodiments, the issues module 214 may be instructed to withhold the generation of issue, when the issue is not validated. In some embodiments, when a large number of issues are determined in a short period of time, the tickets module 236 is instructed to withhold the generation of tickets until the issues module 214 completes the validation of all or substantially all issues. The communications server 238 may be instructed to withhold the tickets until all or substantially all tickets are generated. In some embodiments, the communications server 238 is instructed to transmit a plurality of tickets only when the plurality of tickets are organized and properly grouped based on their common feature.

Methods

FIGS. 3-5C are flowchart diagrams illustrating example methods according to various embodiments of this disclosure. The illustrated flowchart represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the method is described with reference to the systems shown in FIGS. 1-2.

Figure 3:
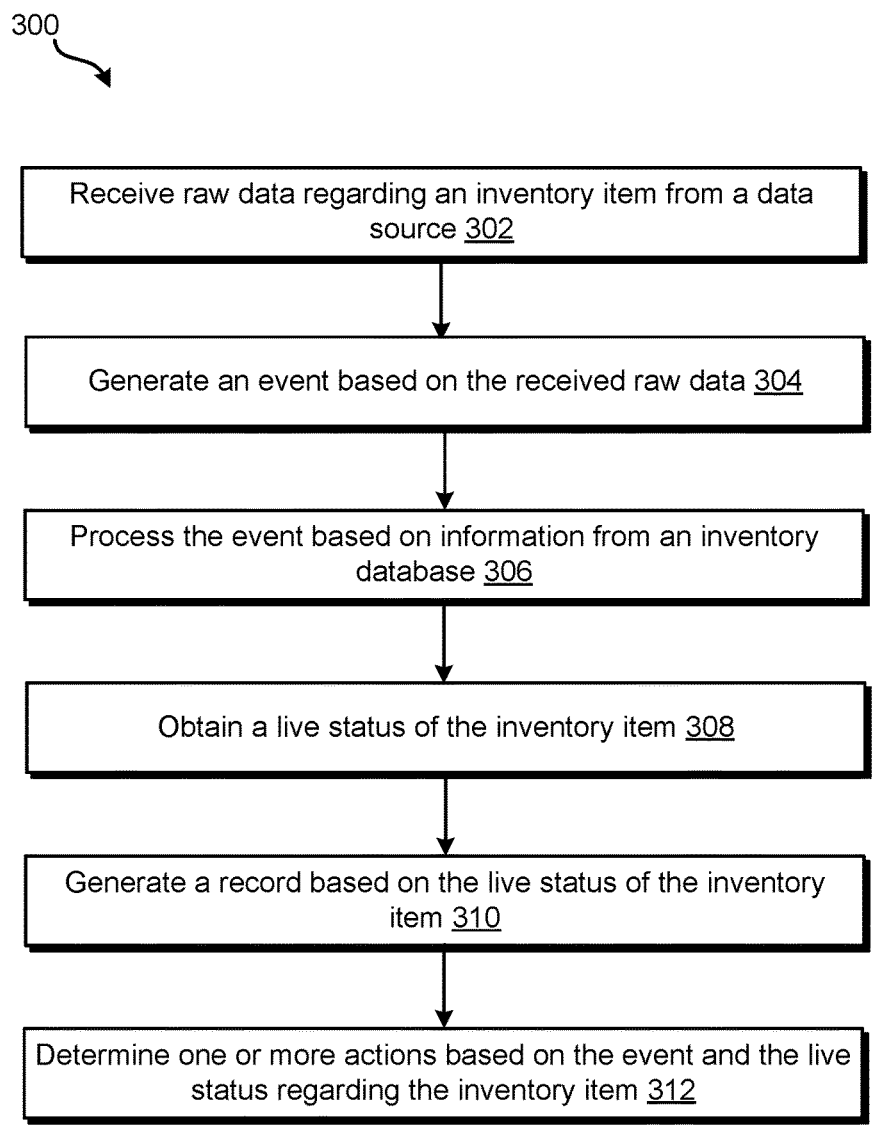
FIG. 3 is a flowchart diagram illustrating an example method according to various embodiments.

FIG. 3 is a flowchart diagram illustrating an example method 300. The method 300 includes operations 302, 304, 306, 308, 310, and 312. At operation 302, inventory data is received from a data source. The inventory data includes information regarding an inventory item involved in one or more transactions. At operation 304, one or more events are generated based on the received inventory data. The one or more events include information regarding the one or more transactions and/or the inventory item involved in the one or more transactions. In some embodiments, the inventory data received from the data sources is converted into supply chain data that is computer-readable and complies with a standard format. An event database is accessed to retrieve an event template. The one or more events are generated according to the event template. The one or more events are computer-readable and contains the supply chain data.

At operation 306, the one or more events are processed based on information from an inventory database. In some embodiments, a SILS database is accessed and serialized inventory information regarding the inventory item is retrieved, the serialized inventory information is compared with the supply chain data of the one or more events.

At operation 308, a live status of the inventory item in relation to the one or more events is obtained based on the comparison of the serialized inventory information and the supply chain data of the one or more events. Examples of the live status of the inventory item (e.g., a user device) include but are not limited to a current lock/unlock status of the user device, a current financial eligibility status of the user device for unlocking, a future date for unlocking, a current status of the network service with respect to a SIM or an eSIM, a time point of activation of the SIM associated with the user device; a duration of time associated with an activation of a user account associated with the user device; a current rate plan associated with the user account; a payment history associated with the user account, whether an account is current (or in default), whether the price of the device has been paid in full (or a remaining balance), and so on.

At operation 310, a SILS record for the inventory item in relation to the one or more events is generated based on the live status of the inventory item. The SILS record may be included in the one or more events. In some embodiments, the SILS record is added to the SILS database to reflect a change in status for the inventory item.

At operation 312, one or more actions are determined based on the one or more events and/or the live status of the inventory item in relation to the one or more events. Examples of the action include but are not limited to: notifying downstream function(s) of the event, instructing downstream function(s) to proceed according to the event, analyzing the event to identify and validate an issue, generating a computer ticket reporting the event, initiating a communication with an internal or external party about the event, and so on.

Figure 4:
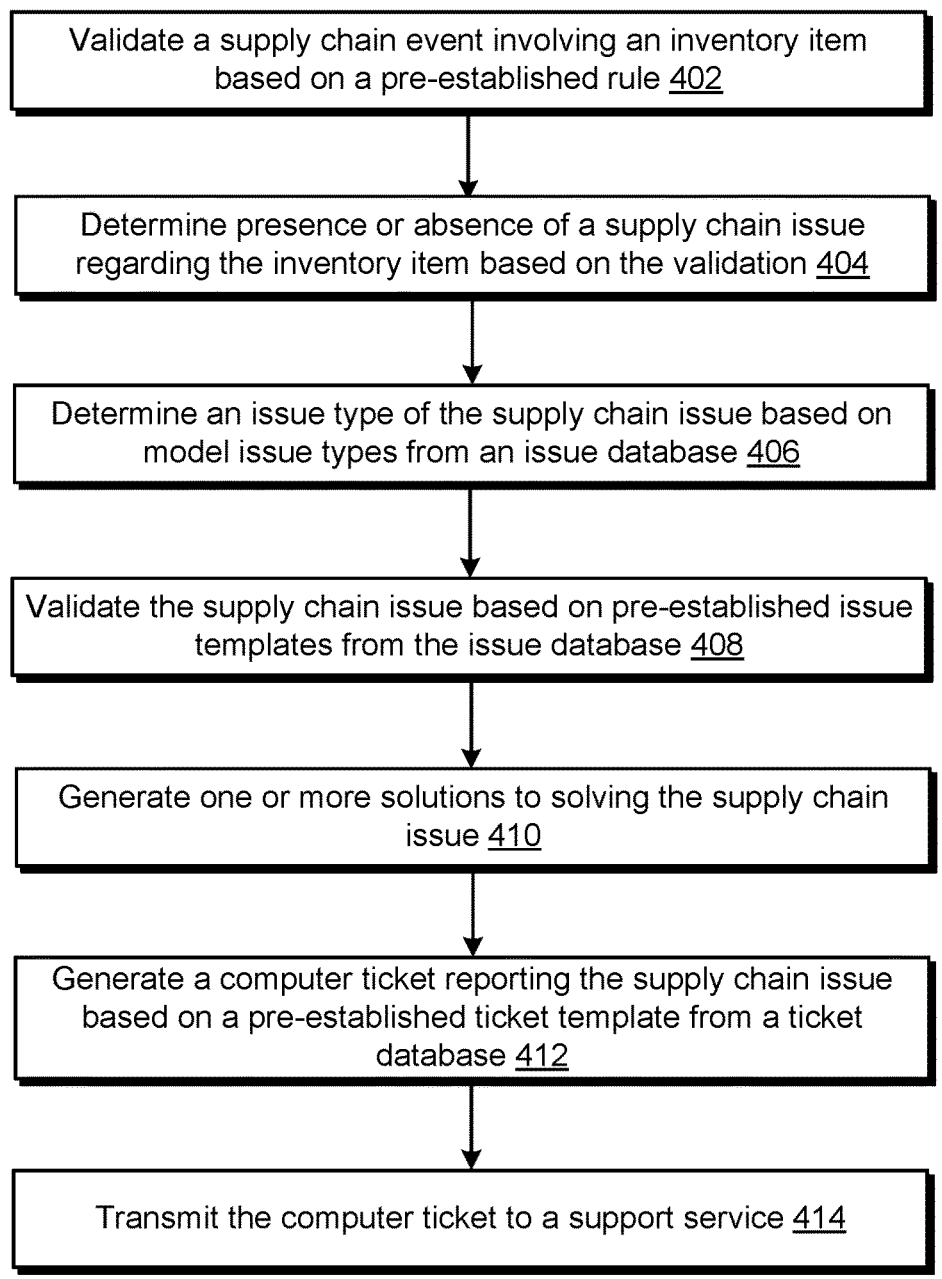
FIG. 4 is a flowchart diagram illustrating another example method according to various embodiments.

FIG. 4 is a flowchart diagram illustrating an example method 400. The method 400 includes operations 402, 404, 406, 408, 410, 412, and 414. The method 400 may be combined with the method 300 or any operations included therein. At operation 402, one or more events are validated based on one or more pre-established rules. The one or more pre-established rules may be retrieved from a rules database where the one or more pre-established rules are stored. The one or more events may involve one or more inventory items, or one or more transactions involving one or more inventory items. The one or more pre-established rules may prescribe one or more conditions upon which an event may be validated. Examples of the pre-established rules for event validation are described above. If the one or more conditions prescribed by the pre-established rules are not satisfied, the event is not validated.

At operation 404, the presence or absence of one or more issues in relation to the one or more events or in relation to the one or more inventory items involved in the one or more events is determined based on the validation of the one or more events. As mentioned above, if the one or more events are not validated according to the one or more pre-established rules, the presence of one or more issues in relation to the one or more events or in relation to the inventory item involved in the one or more events may be determined.

At operation 406, an issue type of each of the one or more issues is determined, based on model issue types from an issues database. In some embodiments, the issues database is accessed to retrieve model issue types, and a model issue type that matches with the issue type of each of the one or more issues in relation to the one or more events is identified. Examples of the issue type include but are not limited to, a procurement issue, a PO issue, an order fulfillment issue, a warehouse issue, a reverse logistics issue, an issue on device lock or unlock, a product registration issue, a shipment issue, a supplier invoice issue, a device activation issue, an IMEI issue, a SIM issue, an EID issue, a SKU issue, a pallet ID issue, a container ID issue, and so on.

At operation 408, the one or more issues are validated based on one or more pre-established issue templates from the issues database. The pre-established issue templates are used to formalize the issue, instruct the generation of a description or statement of the issue, and instruct entry of the relevant data and serialized information regarding the inventory item in relation to the issue. One pre-established issue template may correspond to a specific issue type. In some embodiments, the issue templates are provided by the vendor or product provider for the inventory items.

At operation 410, one or more solutions to the issues are generated. The one or more solutions may be generated based on one or more pre-established solution templates from a solutions database. In some embodiments, the solutions database is accessed, and the one or more pre-established solution templates are identified and retrieved; the one or more validated issues are analyzed; the one or more solutions are generated and recorded according to the one or more pre-established solution templates.

At operation 412, one or more computer tickets are automatically generated to report the one or more validated issues. The one or more tickets may be generated based on one or more pre-established ticket templates from a tickets database. In some embodiments, the one or more issues may be organized or grouped based on a common feature (e.g., a common inventory item, a common issue type, etc.). The one or more issues may be included in the same ticket, or alternatively, included in different tickets. At operation 414, the one or more tickets are transmitted to a support service.

Figure 5A:
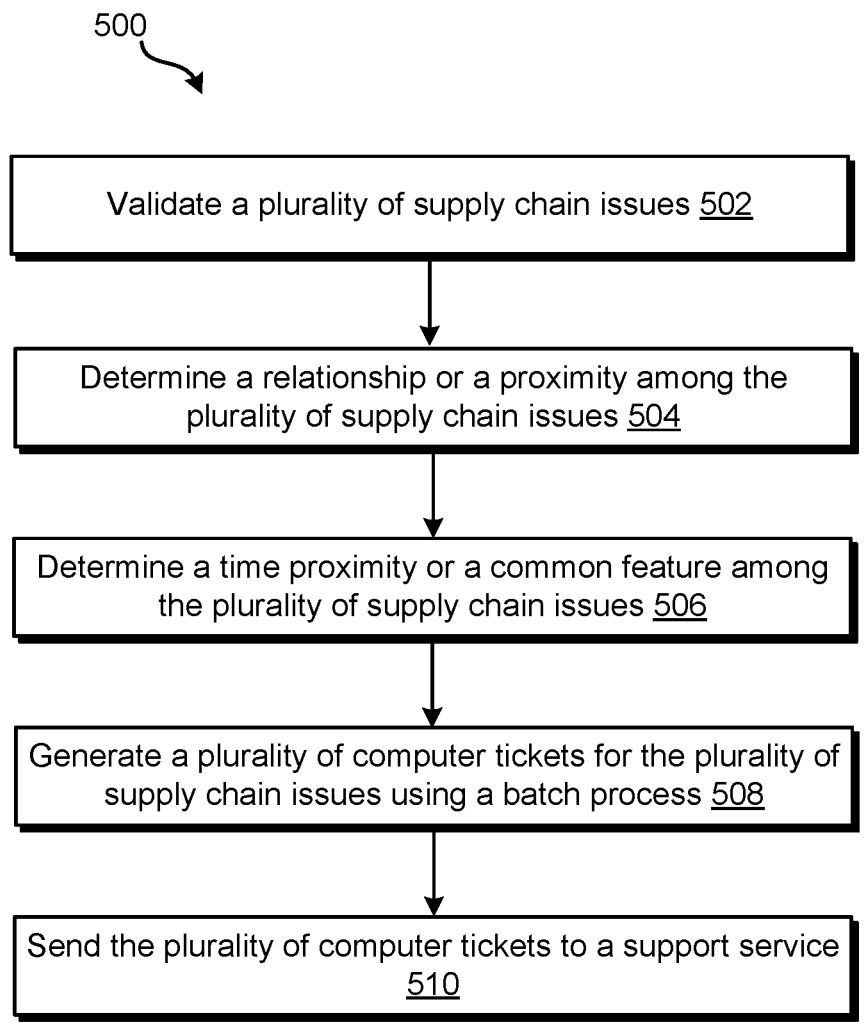
FIG. 5A is a flowchart diagram illustrating yet another example method according to various embodiments.

FIG. 5A is a flowchart diagram illustrating an example method 500. The method 500 includes operations 502, 504, 506, 508, and 510. It is noted that method 500 may be implemented in combination with other methods or any operation thereof according to the present disclosure. At operation 502, a plurality of issues are validated, for example, using operation 408 of the method 400. At operation 504, a relationship between or among the plurality of issues is determined. In some embodiments, the events where the plurality of issues arise from are further analyzed to determine if the plurality of issues share a common feature. For example, the plurality of issues may share a common feature, if they have a common issue type, relate to the same inventory item or the same type of inventory item, relate to the same purchase order, or relate to the same warehouse distribution, etc. At operation 506, time proximity between or among the plurality of issues is determined.

At operation 508, a plurality of tickets for the plurality of issues are generated using a batch process. At operation 510, the plurality of tickets are transmitted to a support service. In some embodiments, the plurality of tickets may be transmitted in one batch to avoid the "ticket flood" problem. For example, the plurality of issues includes 100 issues. The 100 issues arise from different events but are related to the same pallet load in a warehouse distribution. The 100 issues are separately validated within a relatively short period of time (e.g., within a few minutes). A plurality of tickets may be generated when all the plurality of issues are validated. Instead of transmitting each of the plurality of tickets one by one, the plurality of tickets are transmitted to the support service in one batch. In addition, the plurality of tickets may include an alert or warning to warn the support service that the issues included in the plurality of tickets share a common feature. In this way, the "ticket flood" problem is avoided.

Figure 5B:
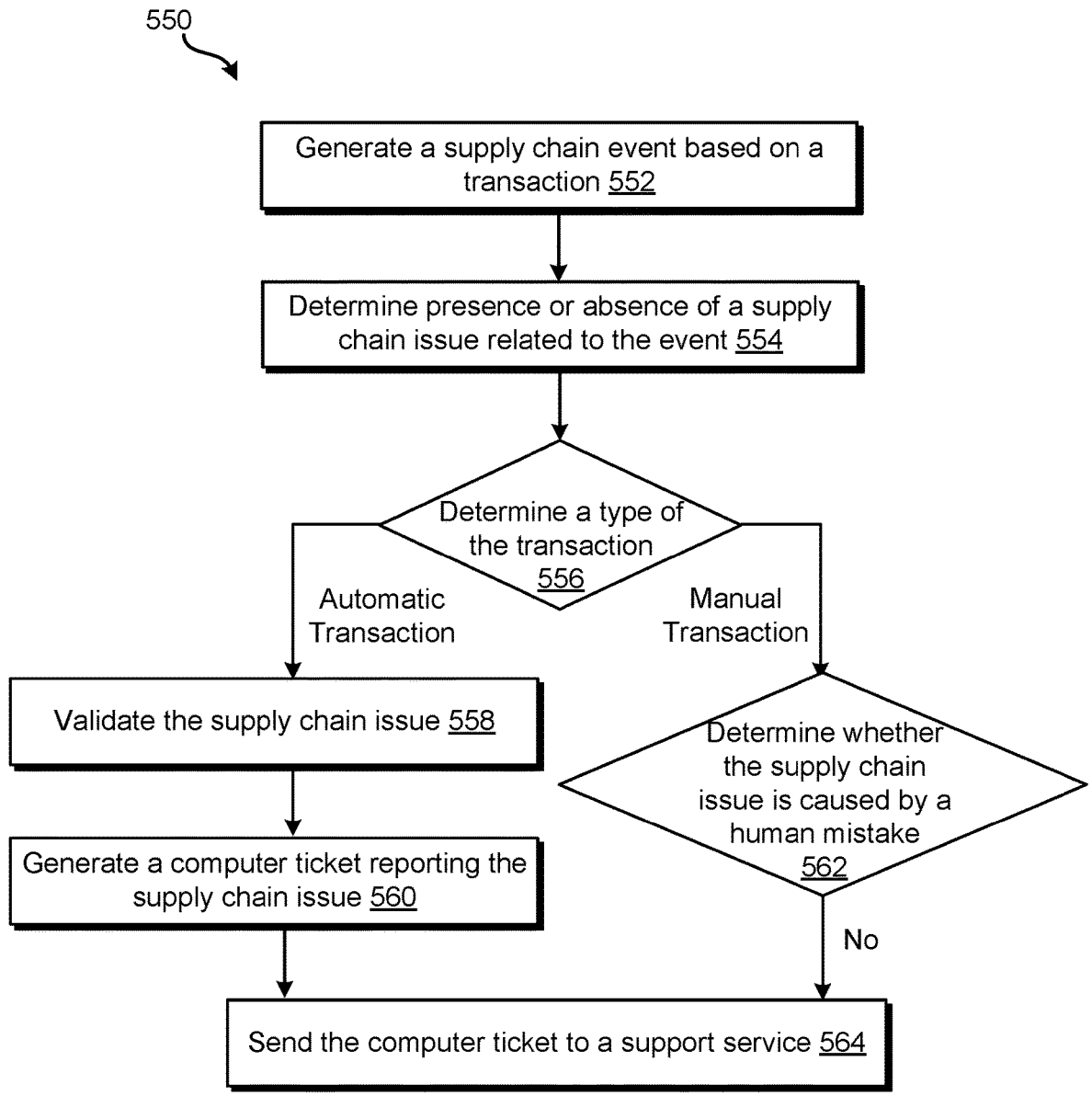
FIG. 5B is a flowchart diagram illustrating a further example method according to various embodiments.

FIG. 5B is a flowchart diagram illustrating an example method 550. The method 550 includes operations 552, 554, 556, 558, 560, 562, and 564. It is noted that method 550 may be implemented in combination with other methods or any operations thereof according to the present disclosure. At operation 552, an event is generated based on a transaction. For example, the event may be generated using operation 304 of the method 300. At operation 554, the presence or absence of an issue related to the event is determined. For example, the presence or absence of the issue may be determined using operation 404 of the method 400. At operation 556, a transaction type of the transaction related to the event is determined. The transaction type may be an automatic transaction or a manual transaction, as mentioned above.

When the transaction type is determined to be an automatic transaction, the method proceeds to operation 558. At operation 558, the issue is validated, for example, using operation 408 of the method 400. At operation 560, a ticket reporting the issue is generated, for example, using operation 412 of the method 400. At operation 564, the ticket is transmitted to a support service, for example, using operation 414 of the method 400.

On the other hand, when the transaction type is determined to be a manual transaction, the method 550 proceeds to operation 562. At operation 562, the issue is analyzed to determine whether the issue is caused by a human mistake during the manual transaction. In some embodiments, the presence or absence of a human mistake involved in the transaction is determined, and then whether the supply chain issue is caused by the human mistake is determined when the presence of the human mistake. Non-limiting examples of a human mistake of a transaction party may include a typo, a missing character or missing number, an error, etc.

In some embodiments, the generation of the computer ticket reporting the supply chain issue may be withheld until the presence or absence of a human mistake is determined. For example, when the likelihood that the issue is caused by a human mistake is high (e.g., above a threshold level), a communication is initiated with the transaction party to verify the human mistake, and no ticket is generated to report the issue. Alternatively, a ticket reporting the issue is generated and temporarily withhold from transmission to the support service, until the presence or absence of the human mistake is ultimately verified by the communication with the transaction party.

Figure 5C:
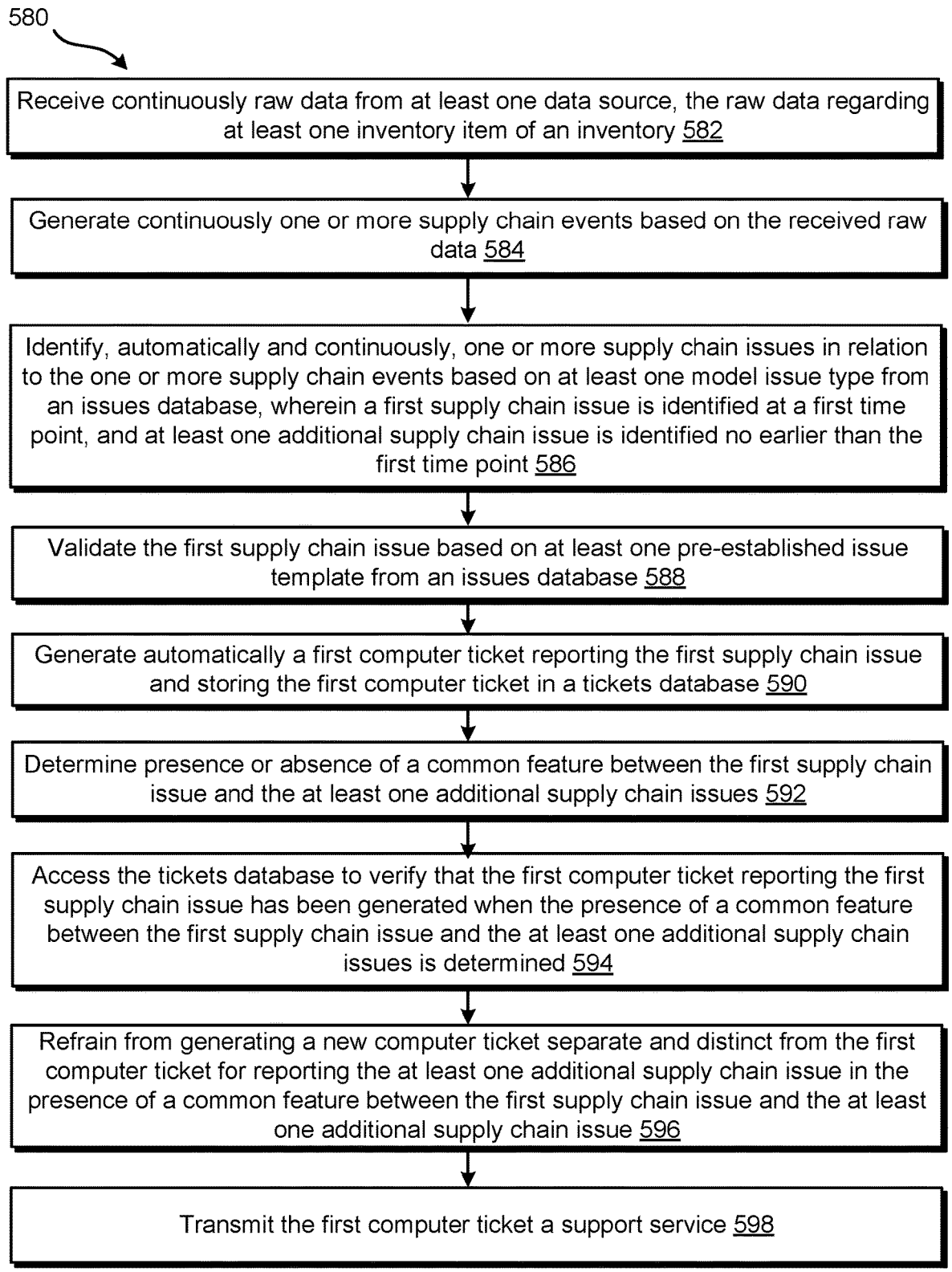
FIG. 5C is a flowchart diagram illustrating a further example method according to various embodiments.

FIG. 5C is a flowchart diagram illustrating an example computer-implemented method 580. The method 580 includes operations 582, 584, 586, 588, 590, 592, 594, 596, and 598. It is noted that method 580 may be implemented in combination with other methods or any operations thereof according to the present disclosure.

At operation 582, inventory data regarding at least one inventory item of an inventory is continuously received from at least one data source. The inventory data includes information regarding the at least one inventory item involved in one or more transactions. In some embodiments, inventory data regarding a plurality of inventory items (e.g., thousands or millions of inventory items) is received. At operation 584, one or more supply chain events are generated based on the received inventory data. In some embodiments, the inventory data received from the data sources is converted into supply chain data that is computer-readable and complies with a standard format. In some embodiments, a supply chain event database is accessed to retrieve a supply chain event template. The one or more supply chain events are generated according to the supply chain event template. The one or more supply chain events are computer-readable and each contain the related supply chain data.

At operation 586, one or more supply chain issues in relation to the one or more supply chain events are identified automatically and continuously. In some embodiments, a large quantity of supply chain issues (e.g., hundreds or thousands) may be identified automatically and continuously within a relatively short period (e.g., one hour or one day). As mentioned above, the supply chain issues may be identified by accessing an issues database, retrieving a model issue type from the issues database, analyzing the supply chain data of the one or more supply chain events to determine an issue type for the supply chain issue that matches with the model issue type. In some embodiments, a first supply chain issue is identified at a first time point, and at least one additional supply chain issue is identified after the first time point.

In some embodiments, a plurality of supply chain issues are identified almost simultaneously or within a relatively short time period (e.g., within one hour). The plurality of supply chain issues include a first supply chain issue identified at a first time point, a second supply chain issue identified at a second time point no earlier than the first time point, a third supply chain issue identified at a third time point no earlier than the second time point, and so forth. The identified supply chain issues may be stored in a temporary issues storage (e.g., a storage of the issues database).

At operation 588, the first supply chain issue identified at the first time point is validated based on at least one pre-established issue template from the issues database. As mentioned above, the issue templates may be used to formalize the supply chain issue, generate a description or statement of the supply chain issue, include relevant supply chain data and serialized information regarding the inventory item in relation to the supply chain issue. In some embodiments, the additional supply chain issues identified after the first time point are not validated until the first supply chain issue is validated.

At operation 590, a first computer ticket reporting the first supply chain issue is automatically generated and stored in a tickets database. As mentioned above, the first computer ticket may include, among other things, a description of the supply chain event, a description of the transaction involved in the supply chain event, a description of the first supply chain issue related to the supply chain event, an alert or warning related to the supply chain issue, and one or more solutions to solving the supply chain issue. In some embodiments, the additional supply chain issues identified after the first time point are not validated until the first computer ticket is generated.

At operation 592, the presence or absence of a proximity (e.g., a *nexus* or a common feature) between the first supply chain issue and the at least one additional supply chain issue is determined. In some embodiments, the presence of the proximity is indicated upon a finding that the first supply chain issue and the at least one additional supply chain issues are related to the same inventory item. In some embodiments, the presence of the proximity is indicated upon a finding that the first supply chain issue and the at least one additional supply chain issues are related to the same supply chain event. In some embodiments, a pre-established rule or a priori knowledge from a rules database can be used to determine the presence or absence of a proximity between the at least one additional supply chain issue and the first supply chain issue.

In one example, the at least one supply chain event relates to a PO made by a customer for a particular inventory item of an inventory, and the SKU number in the PO mismatches with the SKU number recorded in the SKI database with respect to the particular inventory item. The first supply chain issue is identified and validated, and the first supply chain issue has a first issue type (i.e., mismatched SKU number) regarding the particular inventory item. Upon further analysis of the PO, the inventory level of the same inventory item is found to be lower than a threshold level, indicating a potential insufficient supply problem of the particular inventory item. Accordingly, a second supply chain issue having a second issue type (e.g., insufficient supply) regarding the same inventory item as the first supply chain issue is identified. The first supply chain issue and the second supply issue are determined to share a common feature (e.g., both related to the same inventory item), although they have different issue types. In this example, no new computer ticket separate and distinct from the first computer ticket is generated, and the supply chain issues having different issue types but related to the same inventory item could be combined in one single computer ticket (e.g., the first computer ticket) to report all related supply chain issues. As such, the total quantity of computer tickets can be effectively reduced to avoid the "ticket flood" problem and improve the efficiency of supply chain management.

In another example, a supply chain event related to a procurement process is validated. In the procurement process, a pallet of multiple inventory items are received from a supplier, registered in the inventory, and loaded to a warehouse. In the inventory registration process, the pallet ID related to a first inventory item of the pallet is missing or could not be found in a procurement database. A first supply chain issue having a first issue type (e.g., missing pallet ID) regarding the first inventory item is identified and validated. Subsequently, a second supply chain issue having the same issue type (e.g., the first issue type) regarding a second inventory item of the pallet is identified. The second supply chain issue is determined to have a common feature (e.g., both related to the same pallet or the same procurement process) with the first supply chain issue. In some embodiments, multiple supply chain issues can be identified, and each of the multiple supply chain issues is related to one of the inventory items of the same pallet. The multiple supply chain issues have the same issue type and share a common feature (e.g., related to the same pallet). In this example, no new computer ticket separate and distinct from the first computer ticket is generated, and the supply chain issues regarding different inventory items but related to the same pallet could be combined in one single computer ticket (e.g., the first computer ticket) to report all related supply chain issues. As such, the total quantity of computer tickets can be effectively reduced to avoid the "ticket flood" problem and improve the efficiency of supply chain management.

In yet another example, the at least one supply chain event includes a first supply chain event related to a first unlock request for a first user device (i.e., a first inventory item) by a user of the first user device and a second supply chain event related to a second unlock request for a second user device (i.e., a second inventory item) by the same owner. Analysis of the first supply chain event based on the pre-established rules for device unlock indicates that the first user device is not eligible for unlocking. Accordingly, a first supply chain issue having a first issue type (e.g., ineligible device unlock) regarding the first user device is identified and validated. Subsequent analysis of the second supply chain event indicates that the second user device is neither eligible for unlocking, and a second supply chain issue having the same issue type regarding the second user device is identified. An absence of a common feature between the first supply chain issue and the second supply chain issue could be determined, based on the finding that they are neither related to the same supply chain event nor the same inventory item, despite that they belong to the same user. In this example, a second computer ticket separate and distinct from the first computer ticket could be generated to report the second supply chain issue regarding the second inventory item.

In some embodiments, a comparison of the first supply chain issue and the second supply chain issue is performed, based on to a pre-established duplication rule of the rules database, to determine whether the at least one additional supply chain issue is a duplicate of the first supply chain issue. In some embodiments, the at least one additional supply chain issue is determined as a duplicate of the first supply chain issue when they are found related to the same supply chain event, same inventory item, and same issue type. Once a duplicate is determined, the second supply chain issue is invalidated and removed from the temporary issues storage. No new computer ticket is generated to report the duplicated supply chain issue. As such, duplicate computer ticket is effectively prevented.

At operation 594, the tickets database is accessed to verify that the first ticket reporting the first supply chain issue has been generated when the presence of a common feature between the first supply chain issue and the at least one additional supply chain issues is determined. In some embodiments, the absence of a new computer ticket reporting the at least one additional supply chain issue is also verified. On the other hand, when the at least one additional supply chain issue is determined not a duplicate of the first supply chain issue, the first computer ticket may be updated to report both the first supply chain issue and the at least one additional supply chain issue, as mentioned above. As such, multiple related supply chain issues sharing a common feature are combined into one computer ticket, which could avoid ticket flood and improve the overall efficiency of supply chain management.

At operation 596, no new computer ticket separate and distinct from the first computer ticket is generated for reporting the at least one additional supply chain issue, when the presence of a common feature between the first supply chain issue and the at least one additional supply chain issue is determined. On the other hand, in the absence of a common feature between the first supply chain issue and the at least one additional supply chain issue, at least one new computer ticket (i.e., a second computer ticket) separate and distinct from the first computer ticket is generated automatically reporting the at least one additional supply chain issue.

At operation 598, the first computer ticket is transmitted to a support service to handle the first supply chain issue reporting the at least one additional supply chain issue involved in the first computer ticket. In some embodiments, the first computer ticket further includes a first solution to the first supply chain issue, the first solution being generated based on a pre-established solution template from a solutions database. In some embodiments, when at least one new computer ticket separate and distinct from the first computer ticket is generated, the first computer ticket and the at least one new computer ticket (e.g., a second computer ticket) may be transmitted to the support service simultaneously. In some embodiments, an alert is automatically generated when a common feature between the first supply chain issue and the at least one additional supply chain issue is determined. The alert may be included in the first computer ticket that includes both the first supply chain issue and the at least one additional supply chain issue. The alert is generated to notify the support service of the multiple supply chain issues regarding the same inventory item or the same supply chain event.

Computer System

Figure 6:
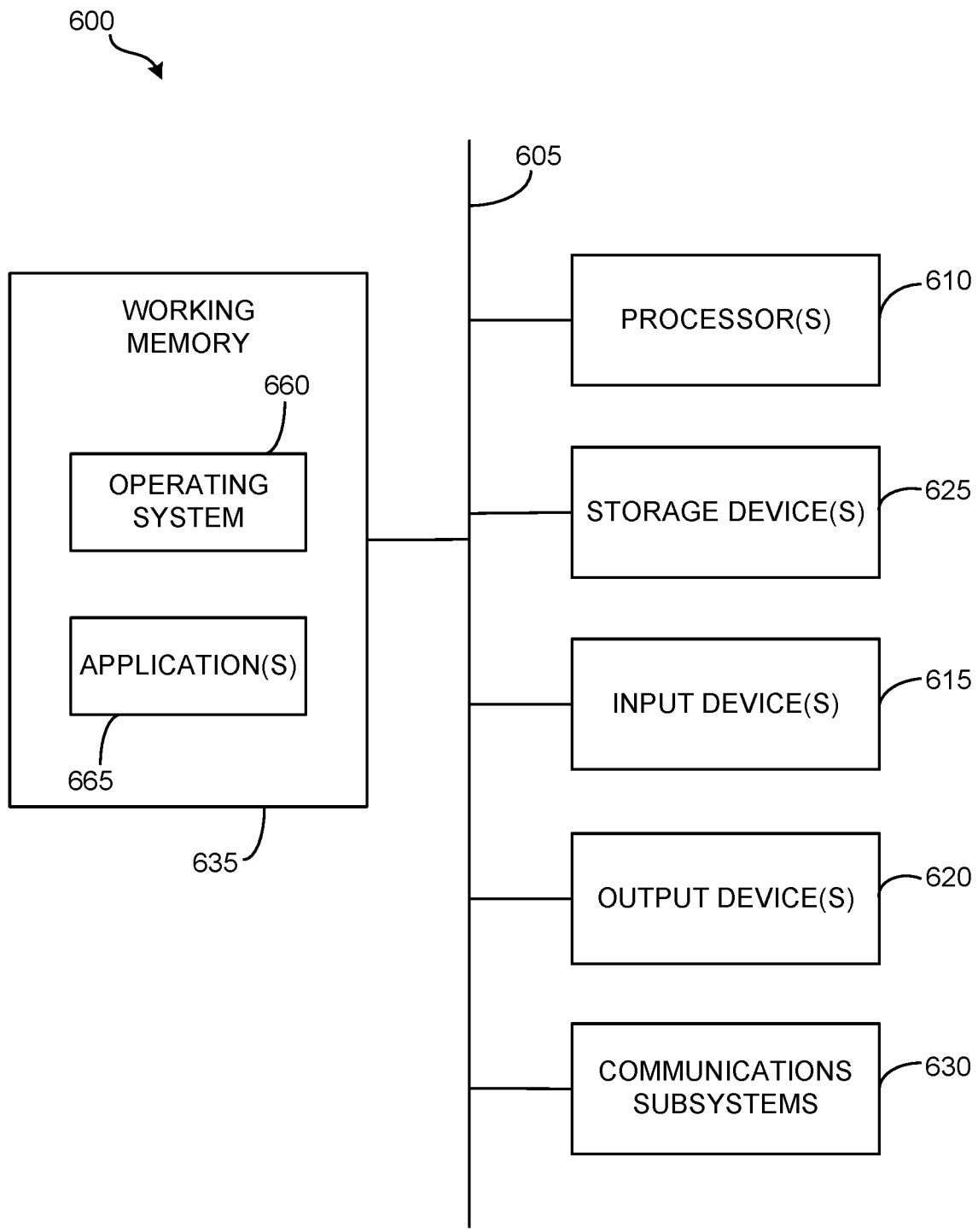
FIG. 6 is a schematic diagram illustrating an example of a computer system according to various embodiments.

FIG. 6 is a schematic diagram illustrating an example of computer system 600. The computer system 600 is a simplified computer system, and can be used to implement various embodiments described and illustrated herein.

A computer system 600 as illustrated in FIG. 6 may be incorporated into devices such as a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 602.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g., the first electronic device, may be incorporated into the computer system 600, e.g., an electronic device as an input device 615. In some embodiments, the computer system 600 will further comprise a working memory 635, which can include a RAM or ROM device, as described above.

The computer system 600 also can include software elements, shown as being currently located within the working memory 635, including an operating system 660, device drivers, executable libraries, and/or other code, such as one or more application programs 665, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 660 and/or other code, such as an application program 665, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

FIG. 6 is a schematic diagram illustrating an example of a computer system according to various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A computer-implemented method, comprising:
    receiving, by an event generation module implemented on a computing system, event data from a data source, the data associated with an object in an inventory, the data comprising at least one of first serialized information associated with the object, a first object identifier associated with the object, or an event type;
    storing, by the event generation module, the event data in an event database, the event data comprising at least one of the first serialized information, the first object identifier, or the event type;
    accessing, by a validation module implemented on the computing system, the event data from the event database, a rule from a rules database, second serialized information from a serialized inventory live status (SILS) database, and a second object identifier from a stock keeping unit inventory (SKI) database;
    identifying, by an issues module implemented on the computing system, a supply chain issue and associated issue type based at least in part on a comparison of the event data to the second serialized information and second object identifier and according to the rule;
    determining, by a solutions module implemented on the computing system, a solution to the supply chain issue, based on the associated issue type; and
    generating, by the computing system, a first supply chain issue ticket, the first supply chain issue ticket comprising the first object identifier, the first serialized information, the event type, a time stamp and the solution.

2. The method of claim 1, further comprising:
    receiving, by the computing system, second event data;
    identifying, by the computing system, a second supply chain issue based on the second event data;
    determining, the computing system and based at least in part on the second event data, whether the first supply chain issue and the second supply chain issue comprise a common feature, the common feature indicated by at least one of:
        the supply chain issue and the second supply chain issues are related to the same object; and
        the first supply chain issue and the second supply chain issue are related to the same event; and
    in accordance with a determination that the first supply chain issue and the second supply chain issue comprise the common feature:
        transmitting the first supply chain issue ticket to a support service.

3. The method of claim 2, further comprising:
    determining that the second supply chain issue is a duplicate of the first supply chain issue; and
    invalidating the second supply chain issue.

4. The method of claim 2, further comprising:
    determining that the second supply chain issue is not a duplicate of the first supply chain issue; and updating the first supply chain issue ticket to comprise the first supply chain issue and the second supply chain issue.

5. The method of claim 2, further comprising:
in accordance with a determination that the first supply chain issue and the second supply chain issue does not comprise the common feature:
generating a second supply chain issue ticket comprising the second event data.

6. The method of claim 1, wherein identifying the supply chain issue and the issue type is based at least in part on an issues template.

7. The method of claim 1, wherein determining the solution is based at least in part on a pre-established solution template stored in a solutions database.

8. A computing system, comprising:
an event generation module;
a validation module;
an issues module;
a solutions module;
one or more processors; and
a computer readable memory comprising instructions that, when executed by the one or more processors, cause the system to:
  receive, by the event generation module implemented by the computing system, event data from a data source, the data associated with an object in an inventory, the data comprising at least one of first serialized information associated with the object, a first object identifier associated with the object, or an event type;
  store, by the event generation module, the event data in an event database, the event data comprising at least one of the first serialized information, the first object identifier, or the event type;
  access, by the validation module implemented by the computing system, the event data from the event database, a rule from a rules database, second serialized information from a serialized inventory live status (SILS) database, and a second object identifier from a stock keeping unit inventory (SKI) database;
  identify, by an issues module implemented by the computing system, a supply chain issue and associated issue type based at least in part on a comparison of the event data to the second serialized information and second object identifier and according to the rule;
    determine, by a solutions module implemented by the computing system, a solution to the supply chain issue, based on the associated issue type; and
  generate, by the computing system, a first supply chain issue ticket, the first supply chain issue ticket comprising the first object identifier, the first serialized information, the event type, a time stamp and the solution.

9. The system of claim 8, wherein the instructions further cause the system to:
receive, by the computing system, second event data;
identify, by the computing system, a second supply chain issue based on the second event data;
determine, by the computing system and based at least in part on the second event data, whether the first supply chain issue and the second supply chain issue comprise a common feature, the common feature indicated by at least one of:
  the supply chain issue and the second supply chain issues are related to the same object; and
  the first supply chain issue and the second supply chain issue are related to the same event; and
in accordance with a determination that the first supply chain issue and the second supply chain issue comprise the common feature:
  transmit the first supply chain issue ticket to a support service.

10. The system of claim 9, further comprising:
determining that the second supply chain issue is a duplicate of the first supply chain issue; and
invalidating the second supply chain issue.

11. The system of claim 9, further comprising:
determining that the second supply chain issue is not a duplicate of the first supply chain issue; and
updating the first supply chain issue ticket to comprise the first supply chain issue and the second supply chain issue.

12. The system of claim 9, wherein:
in accordance with a determination that the first supply chain issue and the second supply chain issue does not comprise the common feature, the instructions further cause the system to:
generate a second supply chain issue ticket comprising the second event data.

13. The system of claim 8, wherein identifying the supply chain issue and the issue type is based at least in part on an issues template.

14. The system of claim 8, wherein the solution is based at least in part on a pre-established solution template stored in a solutions database.

15. A non-transitory computer-readable memory comprising instructions that, when executed by one or more processors, cause the one or more processors to perform operations comprising:
receiving, by an event generation module implemented on a computing system, event data from a data source, the data associated with an object in an inventory, the data comprising at least one of first serialized information associated with the object, a first object identifier associated with the object, or an event type;
storing, by the event generation module, the event data in an event database, the event data comprising at least one of the first serialized information, the first object identifier, or the event type;
accessing, by a validation module implemented on the computing system, the event data from the event database, a rule from a rules database, second serialized information from a serialized inventory live status (SILS) database, and a second object identifier from a stock keeping unit inventory (SKI) database;
identifying, by an issues module implemented on the computing system, a supply chain issue and associated issue type based at least in part on a comparison of the event data to the second serialized information and second object identifier and according to the rule;
determining, by a solutions module implemented on the computing system, a solution to the supply chain issue, based on the associated issue type; and
generating, by the computing system, a first supply chain issue ticket, the first supply chain issue ticket comprising the first object identifier, the first serialized information, the event type, a time stamp and the solution.

16. The non-transitory computer-readable memory claim 15, further comprising:
    receiving, by the computing system, second event data;
    identifying, by the computing system, a second supply chain issue based on the second event data;
    determining, the computing system and based at least in part on the second event data, whether the first supply chain issue and the second supply chain issue comprise a common feature, the common feature indicated by at least one of:
    the supply chain issue and the second supply chain issues are related to the same object; and
    the first supply chain issue and the second supply chain issue are related to the same event; and
    in accordance with a determination that the first supply chain issue and the second supply chain issue comprise the common feature:
        transmitting the first supply chain issue ticket to a support service.

17. The non-transitory computer-readable memory claim 16, further comprising:
    determining that the second supply chain issue is a duplicate of the first supply chain issue; and
    invalidating the second supply chain issue.

18. The non-transitory computer-readable memory claim 16, further comprising:
    determining that the second supply chain issue is not a duplicate of the first supply chain issue; and
    updating the first supply chain issue ticket to comprise the first supply chain issue and the second supply chain issue.

19. The non-transitory computer-readable memory claim 16, further comprising:
    in accordance with a determination that the first supply chain issue and the second supply chain issue does not comprise the common feature:
    generating a second supply chain issue ticket comprising the second event data.

20. The non-transitory computer-readable memory claim 15, wherein identifying the supply chain issue and the issue type is based at least in part on an issues template.

* * * * *